(12) United States Patent
Kiyotaki

(10) Patent No.: US 6,599,579 B1  
(45) Date of Patent: Jul. 29, 2003

(54) LIQUID PRESSURE TRANSFER METHOD, TRANSFER FILM THEREFOR AND PRODUCT DECORATED THEREBY

(75) Inventor: Tomomi Kiyotaki, Shizuoka (JP)

(73) Assignee: Cubic Co., Ltd., Shizuoka (JP)

( * ) Notice: Subject to any disclaimer, the term of this patent is extended or adjusted under 35 U.S.C. 154(b) by 0 days.

(21) Appl. No.: 09/514,337

(22) Filed: Feb. 28, 2000

(30) Foreign Application Priority Data

Sep. 30, 1999 (JP) .......................................... 11-278602

(51) Int. Cl.⁷ .............................. B05D 5/06; B05D 1/18; B44C 1/165
(52) U.S. Cl. .................... 427/430.1; 427/256; 427/280; 156/230; 156/277
(58) Field of Search .............................. 427/430.1, 256, 427/280, 434.3; 156/230, 240, 277

(56) References Cited

U.S. PATENT DOCUMENTS

| | | | | |
|---|---|---|---|---|
| 4,462,853 A | * | 7/1984 | Ringer | 156/238 |
| 6,022,438 A | * | 2/2000 | Watanabe et al. | 156/230 |
| 6,065,366 A | * | 5/2000 | Koyama et al. | 74/552 |
| 6,214,154 B1 | * | 4/2001 | Cho | 156/285 |

FOREIGN PATENT DOCUMENTS

| | | |
|---|---|---|
| AU | 19797/76 | 7/1977 |
| DE | 19824544 | 12/1998 |
| GB | 2001908 | 2/1979 |

* cited by examiner

Primary Examiner—Michael Barr  
(74) Attorney, Agent, or Firm—Wenderoth, Lind & Ponack, L.L.P.

(57) ABSTRACT

A workpiece to which a transfer pattern is to be applied is formed to have a rod-like element curved into a loop-like shape to form an apparent geometric plane. A transfer film used in the liquid pressure transfer is formed on a required portion thereof, and the transfer pattern for decoration is formed to have a configuration corresponding to that of the apparent plane. The workpiece is handled so as to downwardly approach the transfer film from a position corresponding to the transfer pattern, and is then immersed in the transfer liquid. Consequently, the transfer film bonds to the rod-like element of the workpiece so as to circumferentially surround the rod-like element continuously from a bottom of the rod-like element to a top thereof on the basis of a diametric section of the rod-like element. Thus, the transfer pattern is transferred to at least the rod-like element of the workpiece.

22 Claims, 6 Drawing Sheets

LIQUID PRESSURE TRANSFER METHOD, TRANSFER FILM THEREFOR AND PRODUCT DECORATED THEREBY

BACKGROUND OF THE INVENTION

This invention relates to a liquid pressure transfer method, and more particularly to a liquid pressure transfer printing method for applying a pattern for decoration specifically intended for a workpiece such as a steering wheel for an automobile or the like which includes a rod-like element curved to form a predetermined apparent plane to the workpiece.

For example, a steering wheel for an automobile has a core made of a metal material so as to exhibit strength of at least a predetermined level. The core is provided therearound with a grip surface, which is formed of a material such as a plastic material, a wooden material, a leather material or the like, which is selected depending on requirements such as operability of the steering wheel, decorative characteristics thereof and the like. For example, a steering wheel provided thereon with a wooden surface is evaluated to be a high-quality article, because it exhibits both satisfactory operability and decorative characteristics and requires considerable labor and time for manufacturing. However, a recent tendency to reconsider the easygoing use of a natural material in view of protecting the natural environment, and a demand for reduction of a manufacturing cost had led to development of liquid pressure transfer printing techniques. These techniques involve transfer printing on a plastic steering wheel material in place of a wooden steering wheel material to apply a woodgrain pattern for decoration thereto.

Application of a decorative pattern to a workpiece by liquid pressure transfer permits formation of a natural pattern which exhibits satisfactory conformability to a configuration of the workpiece, resulting in the technique being extensively practiced on a variety of workpieces. However, application of such liquid pressure transfer to, for example, a steering wheel encounters some important problems. A conventional steering wheel made of a wooden material is manufactured by subjecting two wooden rod-like materials which are semicircular in section to a treatment by moistening and heating to bend them into an annular shape, and then bonding them to each other while interposing a core therebetween. Thus, of course the wooden materials are each so arranged that a straight grain extends in a circumferential direction of the steering wheel. Such arrangement of the straight grain permits a user to have a sense of security or a sense of reliability.

Unfortunately, in application of a decorative pattern to a workpiece by liquid pressure transfer, a transfer film having a transfer pattern formed thereon is supported on a surface of a transfer liquid while being floated thereon, so that exact positioning or registration between the transfer film and the workpiece is relatively difficult. Thus, in the prior art, a continuously-formed decorative pattern such as a woodgrain pattern, a natural stone pattern, or a carbon fiber pattern is arranged all over the transfer film so as to allow misregistration which occurs between the transfer film and the workpiece. Consequently, a decorative pattern similar to a natural material is provided irrespective of a portion of the pattern transferred to the workpiece. Nevertheless, development of techniques of reproducing a transfer pattern specifically intended for a desired product such as, for example, techniques of arranging a straight grain pattern in a circumferential direction of a steering wheel, are still demanded.

SUMMARY OF THE INVENTION

The present invention has been made in view of the foregoing disadvantage of the prior art.

Accordingly, it is an object of the present invention to provide a liquid pressure transfer method which is capable of applying a decorative pattern specifically intended for a specific or desired workpiece such as a steering wheel or the like to the workpiece.

It is another object of the present invention to provide a transfer film which is capable of facilitating application of a decorative pattern specifically intended for a workpiece such as a steering wheel or the like to the workpiece.

It is a further object of the present invention to provide a product decorated according to the liquid pressure transfer method described above.

In accordance with one aspect of the present a liquid pressure transfer method for carrying out liquid pressure transfer printing on a workpiece such as a steering wheel is provided. The liquid pressure transfer method includes the step of supporting a transfer film on a surface of a transfer liquid while floating it thereon. The transfer film has a transfer pattern for decoration printed thereon. The liquid pressure transfer method also includes the step of downwardly immersing a workpiece in the transfer liquid to transfer the transfer pattern to a surface of the workpiece, to thereby decorate the workpiece. The workpiece includes a rod-like element curved into a loop-like shape, resulting in it being formed in an apparent geometric plane which permits the workpiece to be recognized as a whole. The transfer pattern is formed to have a configuration corresponding to a configuration of the apparent plane of the workpiece, and is arranged on a required position of the transfer film. The workpiece is handled so as to approach the transfer film from a position above the transfer pattern corresponding to the transfer pattern and is then immersed in the transfer liquid. Therefore, the transfer film bonds to the rod-like element of the workpiece in a manner to circumferentially surround the rod-like element continuously from a bottom of the rod-like element to a top thereof on the basis of a diametric section of the rod-like element, resulting in the transfer pattern being transferred to at least the rod-like element of the workpiece.

The liquid pressure transfer method thus constructed permits the workpiece, such as a steering wheel or the like which includes the rod-like element curved to form a predetermined apparent plane, to be readily and positively decorated with a transfer pattern specifically intended for the workpiece.

In a preferred embodiment of the present invention, an approach attitude angle defined between the apparent plane of the workpiece and the surface of the transfer liquid is set to be within a range of ±15°. This permits the optimum approach attitude angle to be set depending on a type of the transfer pattern, as well as a size of the workpiece, a configuration thereof and the like.

In a preferred embodiment of the present invention, the workpiece is immersed in the transfer liquid in a substantially vertical direction. Such vertical lowering of the workpiece to the surface of the transfer liquid facilitates transfer of the transfer pattern to the workpiece.

In a preferred embodiment of the present invention, the transfer film is provided thereon with reference position marks for enabling relative registration between the transfer pattern and the workpiece. This permits positioning or registration between the transfer pattern and the workpiece to be readily attained while preventing misregistration of the transfer film.

In accordance with another aspect of the present invention, a transfer film is provided. The transfer film includes a film body which has a transfer operation surface defined thereon. The transfer operation surface has a predetermined transfer pattern previously printed thereon in transfer ink. When transfer is to be carried out, the transfer operation surface is coated thereon with an activator to permit a portion of the transfer operation surface to which the transfer ink is applied to exhibit stickiness. The transfer film is supported on a surface of a transfer liquid while being floated thereon. The transfer pattern is transferred to a surface of a workpiece by a liquid pressure produced when the workpiece is downwardly immersed in the transfer liquid. The transfer film is applied to the workpiece including a rod-like element curved into a loop-like shape, resulting in the workpiece being formed with an apparent plane which permits the workpiece to be recognized as a whole. The transfer pattern is formed to have a configuration corresponding to a configuration of the apparent plane of the workpiece and arranged on a required position of the transfer film. The transfer film thus constructed permits the transfer pattern specifically intended for the workpiece to be readily applied to the workpiece, to thereby facilitate decoration of the workpiece.

In a preferred embodiment of the present invention, the workpiece is a steering wheel. The transfer pattern is formed to have a substantially annular shape in correspondence to the apparent plane of the steering wheel. Thus, in the present invention, although distortion of the pattern is varied depending on a position on a circumference of a diametric section of the rod-like element of the workpiece, the pattern distortion in a circumferential direction of the whole steering wheel is substantially the same irrespective of a position on the rod-like element in the circumferential direction thereof. Thus, the transfer printing may be carried out while rendering the pattern distortion inconspicuous.

In a preferred embodiment of the present invention, the transfer pattern is formed to have a substantially annular shape by taking in pattern data having a plane rectangular shape and then converting the pattern data into pattern data having a round shape. This permits the transfer pattern specifically intended for the workpiece to be more exactly reproduced on the workpiece.

In accordance with a further aspect of the present invention, there is provided a decorated product to which a predetermined decorative pattern is applied by subjecting a workpiece such as a steering wheel or the like including a rod-like element to liquid pressure transfer printing in which the workpiece is downwardly immersed in a transfer liquid which supports a transfer film having a transfer pattern for decoration printed on a surface thereof while floating it on the transfer liquid. Therefore, the transfer pattern is applied to at least the rod-like element of the workpiece. The workpiece is operated so as to permit the transfer pattern to be printed on the rod-like element of the workpiece in a manner to circumferentially surround the rod-like element continuously from a bottom of the rod-like element to a top thereof on the basis of a diametric section of the rod-like element. Consequently, transfer of the transfer pattern to the workpiece is carried out according to the above-described liquid pressure transfer method while ensuring exact reproducibility of the transfer pattern.

Such construction permits the transfer pattern to be more exactly reproduced on a variety of workpieces of a closed loop shape or an open loop shape including, for example, a hula hoop, rings in gymnastic, a towel ring, a chair back, a handrail and the like in addition to the steering wheel while minimizing distortion of the transfer pattern.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described in detail with reference to the accompanying drawings. The following description will be first made on a workpiece to be decorated according to the present invention. Then, a liquid pressure transfer printing apparatus for carrying out liquid pressure transfer printing on such a workpiece is schematically described. Subsequently, a liquid pressure transfer printing method according to the present invention will be described together with a manner of operation of the liquid pressure transfer printing apparatus.

Figure 1A:
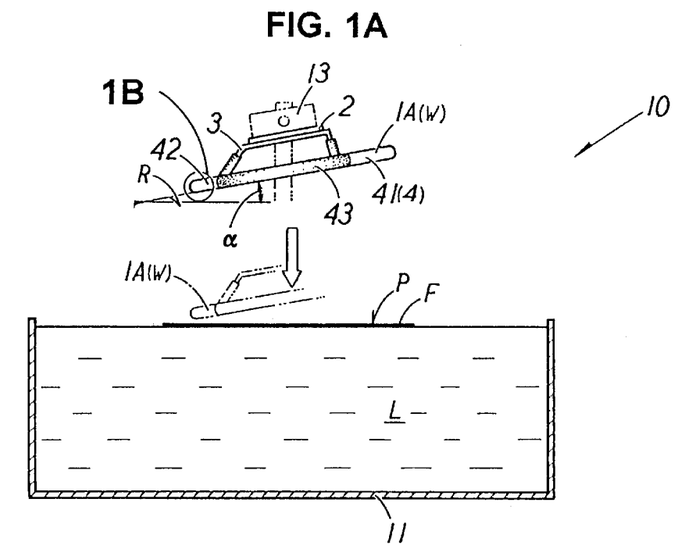
FIG. 1A is a schematic side elevation view showing an apparatus which is adapted to practice a liquid pressure transfer method according to the present invention, wherein an immersion angle is set to be 0° by way of example.
Figures 1B, 2:
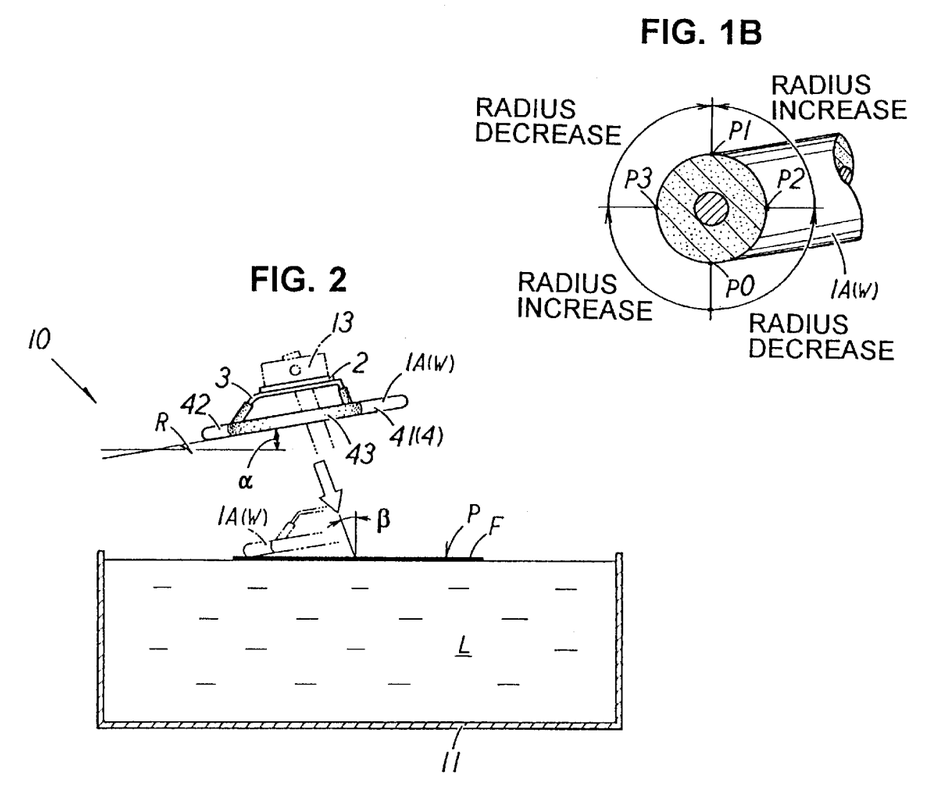
FIG. 1B is an enlarged partial cross sectional view of part 1B of FIG. 1A.
FIG. 2 is a schematic side elevation view showing the apparatus which is adapted to practice a liquid pressure transfer method according to the present invention, the immersion angle is set to be 20°.

A workpiece designated by reference character W in FIGS. 1A, 1B and 2 includes a rod-like element formed to be curved to define a predetermined apparent geometric plane R which permits the workpiece to be recognized as a whole. Thus, the workpieces to which the present invention is applicable may include, for example, a steering wheel mounted on a vehicle or the like, as well as products of an annular shape, a substantially O-shape or the like which form a closed loop such as a hula hoop, rings in gymnastics, a towel ring and the like, and products of a substantially U-shape which form an open loop such as a chair back and the like. Further, the workpieces may include products such as a handrail for stairs and the like wherein two loop-like members are connected together through one or two straight members.

The apparent plane R is defined as a plane literally when the present invention is applied to a steering wheel as the workpiece W. However, it is not necessarily defined as a plane when the present invention is applied to a chair back as the workpiece W. In that case, the apparent plane R may be often defined so as to somewhat have a curvature.

Also, the illustrated embodiment will be described essentially in connection with the case that the present invention is applied to a steering wheel as the workpiece W. Thus, when it is necessary to distinguish a steering wheel before the liquid pressure transfer printing of the present invention from a steering wheel after the transfer printing, a steering wheel which has been subjected to the liquid pressure transfer printing is designated by reference character 1, and a steering wheel before the printing is designated by 1A.

Figure 4A:
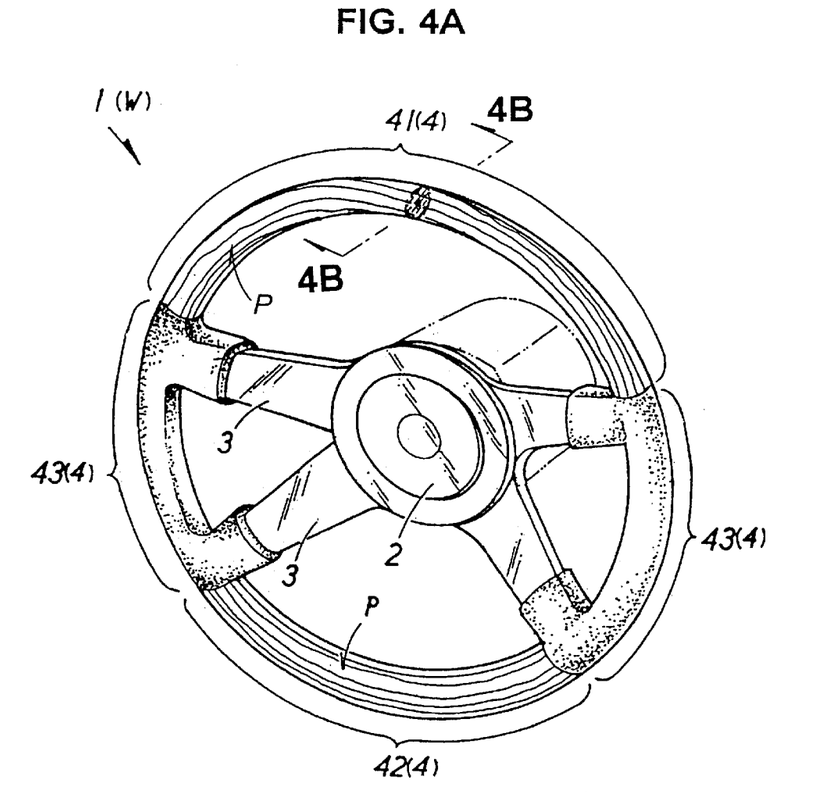
FIG. 4A is a perspective view showing a steering wheel which is an example of a decorated product according to the present invention.
Figure 4B:
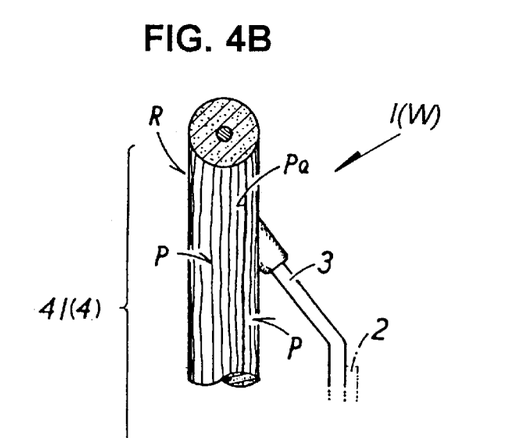
FIG. 4B is a sectional view taken along line 4B—4B of FIG. 4A.

Now, the steering wheel 1 which has been subjected to the liquid pressure transfer printing will be described with reference to FIGS. 4A and 4B by way of example. The steering wheel 1 includes a boss section 2 acting as a center of rotational movement of the steering wheel 1, spoke sections 3 arranged so as to radially extend from the boss section 2, and a rim section 4 connected to a distal end of each of the spoke sections 3 and formed to have a substantially annular shape. The rim section 4, as shown in FIG. 4A, includes a long rim portion 41 of an elongated arcuate shape (positioned on an upper side in FIG. 4A), a short rim portion 42 of a short arcuate shape (positioned on a lower side in FIG. 4A), and two grip portions 43 for connecting the long rim portion 41 and short rim portion 42 to each other therethrough (positioned on both lateral sides in FIG. 4A). The long rim portion 41 and short rim portion 42 have a transfer pattern P specifically intended for the workpiece W such as a woodgrain pattern, a straight grain pattern or the like, applied thereto and is formed thereon with a topcoat.

The grip portions 43 are each connected to the spoke sections 3 which extend from the boss section 2. It is considered that the spoke sections 3 cause force which is different from that acting on the other portions, such as the long rim portion 41 and short rim portion 42, to act on the transfer film F during the transfer. This prevents liquid pressure transfer printing like that carried out on the other portions to be attained on the grip portions 43. Thus, for example, techniques of wrapping a suitable material such as leather or the like around the grip portions 43 may be employed after transfer printing, to thereby hide printing applied to the grip portions 43 or to apply a special decoration effect or a grip feel to the grip portions. However, unless printing applied to the grip portions 43 adversely affects an appearance of the product or causes any problem, such techniques may be eliminated. Also, when it is not desired to apply liquid pressure transfer printing to the grip portions 43, they may be covered with any suitable masking material in advance.

In printing applied to the rim section 4, the transfer pattern P specifically intended for the workpiece W or steering wheel 1A is transferred to the rim section 4, wherein the illustrated embodiment permits pattern distortion to be inconspicuous as compared with the prior art. This is due to the fact that the transfer pattern P is substantially formed to have an annular shape corresponding to a configuration of the steering wheel 1A. More particularly, in a diametric section of the rod-like element of the steering wheel 1A or a section of the rod-like element of the steering wheel taken in a diametric direction of the rod-like element, distortion of the transfer pattern P is varied depending on a position on a circumference of the diametric section of the rod-like element. However, the pattern distortion in a circumferential direction of the whole steering wheel 1A is substantially the same irrespective of positions thereof. This permits the pattern distortion on the whole steering wheel 1A to be inconspicuous as a whole. The transfer pattern P is so arranged that a joint line Pa of the transfer pattern P is positioned on a rear surface of the steering wheel 1 which is substantially out of sight of a driver when the steering wheel is mounted in a vehicle.

Now, a liquid pressure transfer printing apparatus 10 will be described with reference to FIG. 1A by way of example. The liquid pressure transfer printing apparatus 10 includes a transfer bath 11, a transfer film storage unit (not shown) and a workpiece holding unit 13.

The transfer bath 11 has a transfer liquid L stored therein, and a transfer film F is supported on a surface of the transfer liquid L while being floated thereon. In the illustrated embodiment, the transfer films formed in individual sheets are fed to the transfer bath 11 one by one by hand so as to be floated on the transfer liquid L, so that the transfer liquid L is always kept stationary.

The transfer film storage unit is constructed so as to permit the transfer films F to be taken out thereof one by one.

Figure 3A:
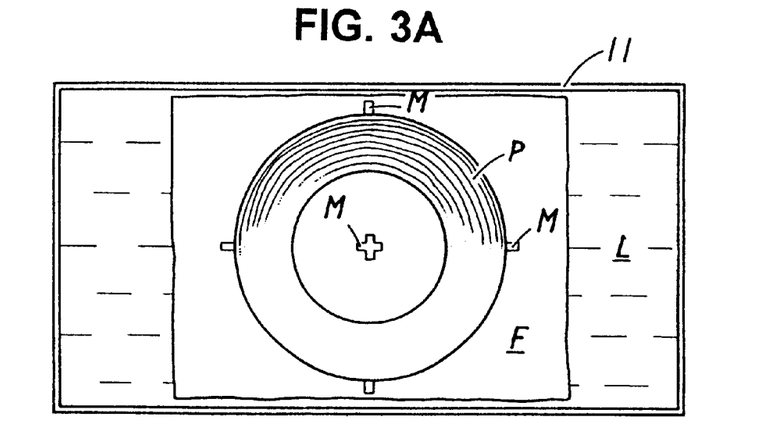
FIGS. 3A to 3C are plan views showing a transfer pattern formed on a transfer film.
Figure 3B:
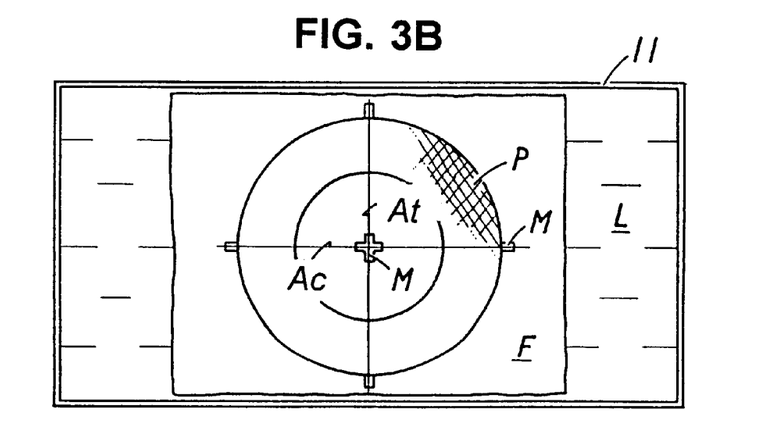
Figure 3C:
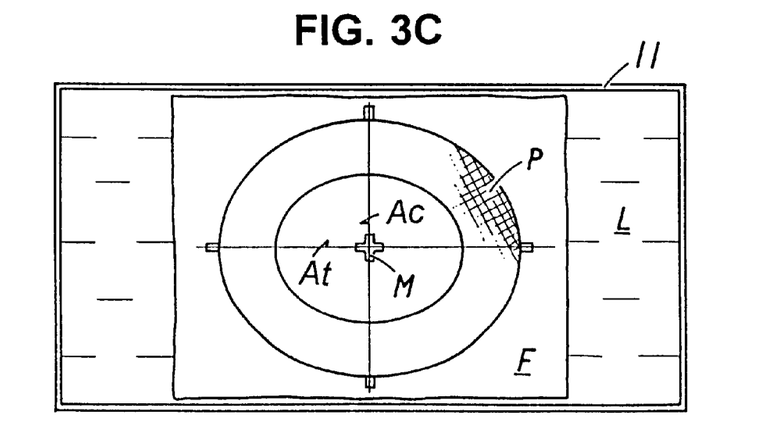

The transfer film F may be formed to have a rectangular configuration as shown in each of FIGS. 3A to 3C by way of example. The transfer film F includes a film body which has a transfer operation surface defined thereon. The transfer operation surface has the transfer pattern P for decoration formed only on a required position thereof corresponding to a configuration of the apparent plane R of the workpiece W. In the illustrated embodiment, the transfer pattern P is formed to have a substantially annular shape corresponding to the configuration of the rim section 4 of the steering wheel 1. Also, the transfer film F is suitably provided thereon with reference position marks M which permit relative positioning or registration between the transfer pattern P and the workpiece W to be carried out therethrough. In the illustrated embodiment, the reference position marks M include a cross-like mark arranged on a substantially central position of the transfer pattern, four radial marks arranged at substantially equal angular intervals on an outside of the transfer pattern P, and the like by way of example, as shown in each of FIGS. 3A to 3C.

A transfer film F shown in FIG. 3A is adapted to be directed to decoration of the workpiece W carried out when the workpiece W is vertically lowered to the surface of the transfer liquid L while maintaining an approach attitude angle β of the workpiece W at 0°. The transfer film F of FIG. 3A has a transfer pattern P of a substantially concentric shape formed thereon with high accuracy. A transfer film F shown in FIG. 3B is directed to the decoration when the workpiece W is vertically lowered to the liquid surface while maintaining the approach attitude angle β at suitable degrees. Thus, the transfer film F of FIG. 3B corresponds to that shown in FIG. 1. The transfer film F of FIG. 3B has a transfer pattern P which is formed to have a substantially annular shape provided thereon, wherein a major axis Ac and a minor axis At thereof extend in a vertical direction and a horizontal direction of FIG. 3B, respectively. A transfer film F shown in FIG. 3C is directed to decoration of the workpiece W when it is obliquely lowered to the liquid surface while maintaining an approach attitude angle (a thereof at suitable degrees. The transfer film F corresponds to that described hereinafter with reference to FIG. 2. Thus, the transfer film F of FIG. 3C has a transfer pattern P formed to have a substantially annular shape, wherein a minor axis At and a major axis Ac thereof extend in a vertical direction and a horizontal direction of FIG. 3C, respectively. The term "substantially annular shape" referred to herein indicates such configurations as shown in FIGS. 3A to 3C. Thus, the substantially annular shapes include a substantially complete annular shape as shown in FIG. 3A, as well as somewhat deformed annular shapes as shown in FIGS. 3B and 3C. Therefore, as seen in the attached drawings, the transfer pattern is printed only on an area of the transfer film F that has a shape corresponding to a surface shape of the workpiece W to be covered by the transfer pattern. Also, the transfer film F shown in each of FIGS. 3A to 3C has only one transfer pattern P printed thereon. Alternatively, the transfer film may have a plurality of transfer patterns P printed thereon.

Figure 7:
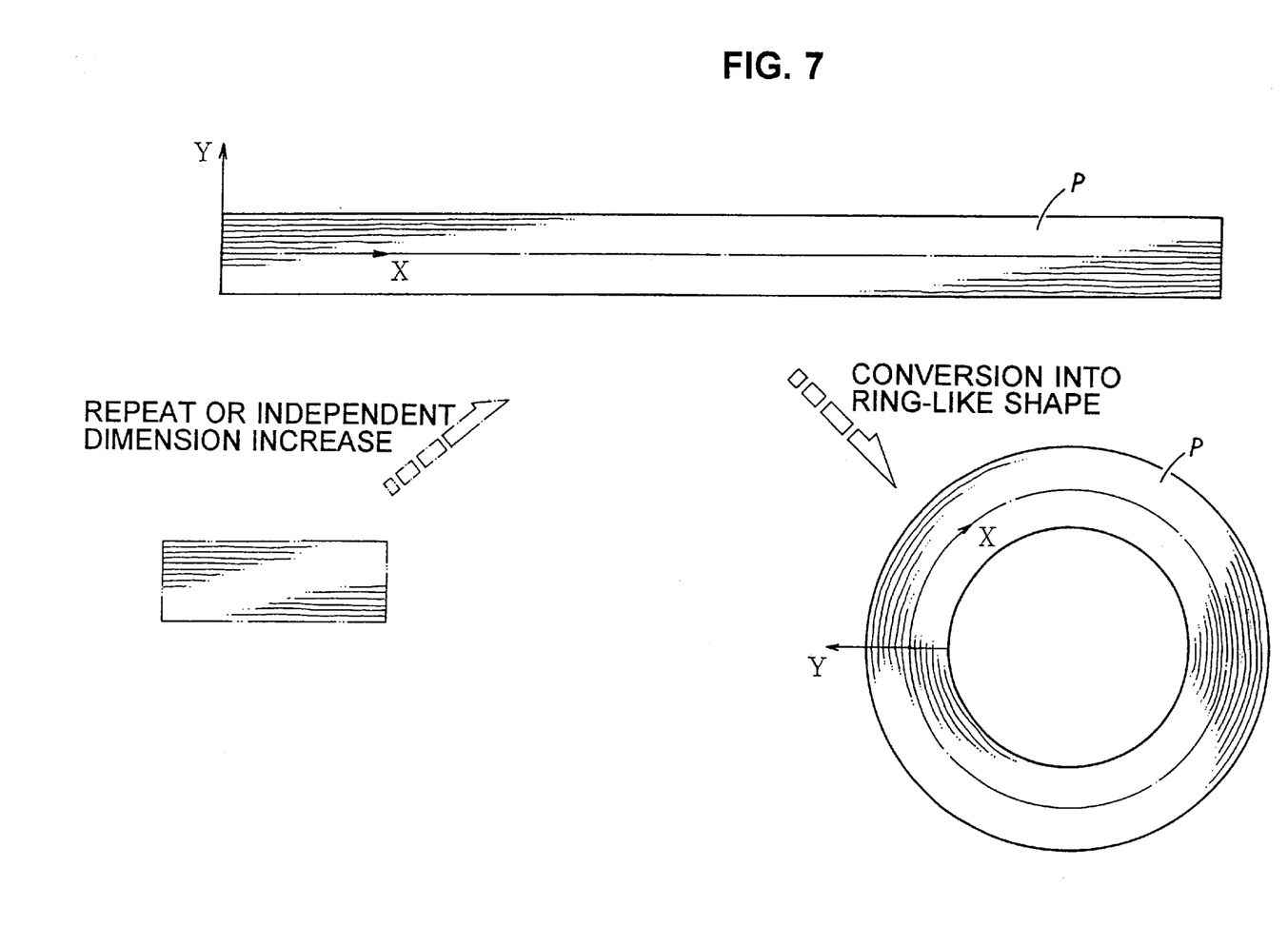
FIG. 7 is a schematic view showing a procedure for converting pattern data of a rectangular shape into pattern data of an annular shape.

Further, forming the transfer pattern P into a substantially annular shape for the purpose of transferring, for example, a woodgrain pattern to the workpiece is carried out by subjecting an image of a woodgrain actually photographed to image processing by means of a computer or preparing a picture of a woodgrain directly by means of a computer, to thereby convert a pattern to be transferred into pattern data of a plane rectangular shape. Then, the plane rectangular pattern data thus converted are converted into pattern data of a round or ring-like shape on the computer, resulting in the transfer pattern P being formed to have a substantially annular shape. Thus, it will be noted that when the plane rectangular pattern before the conversion is represented in a coordinate system containing X and Y coordinate axes which are perpendicular to each other as shown in FIG. 7, the conversion permits the X axis to be converted into a circumferential direction and the Y axis to be converted into a radial direction, resulting in the transfer pattern P of a substantially annular shape being provided. Of course, the operation of joining opposite ends of the plane rectangular shape to each other is carried out with suitable image processing for rendering the joint inconspicuous, such as connecting woodgrain lines to each other.

The above description has been made for conversion of the transfer pattern into a round shape carried out immediately after taking in the transfer pattern as the pattern data of a plane rectangular shape. However, for example, it is considered that the pattern data photographed may be too small to be developed in the circumferential direction. More particularly, the pattern data of a plane rectangular shape indicated by solid lines shown in FIG. 7 have a dimension in the X axis direction sufficient to be converted into the circumferential direction. However, the pattern data having such a large size is not necessarily photographed. In order to solve the problem, an approach may be employed which is constructed so as to introduce pattern data of a small size readily photographed into an image processing unit and to repeat the pattern data to prepare plane rectangular pattern data of a desired large size.

Another approach which may be employed is to introduce pattern data of a small size into an image processing unit and then independently multiply a longitudinal dimension of the pattern data and a lateral dimension thereof on a screen of the unit to obtain plane rectangular pattern data of a desired size. Repeating of such small-sized pattern data for formation of such plane rectangular pattern data of a desired size may be carried out on the same pattern. Alternatively, patterns different from each other may be connected to each other. The operation of multiplying the longitudinal dimension and lateral dimension independently from each other is effective to not only convert the pattern data into a desired size but also, for example, to set the density of woodgrain lines at a suitable level.

The workpiece holding unit 13 functions to immerse the steering wheel 1A into the transfer liquid L while holding it. In the immersion, an approach attitude angle a defined between the apparent plane R of the workpiece W and the surface of the transfer liquid L is set to be within a range of ±15° based on a horizontal direction. The symbols "+" and "−" referred to herein do not have any specific definition. They merely mean that one rotational direction from a certain reference position indicates "+" and the other rotational direction indicates "−". Also, in the illustrated embodiment, the workpiece W is immersed in the transfer liquid L in a vertical direction as shown in FIG. 1A. However, a direction of immersion of the workpiece W may be suitably varied. In the present invention, the direction of immersion is indicated by an angle β between the direction of immersion and a line normal to the surface of the transfer liquid, which angle is defined to be an immersion angle herein. When the workpiece is immersed in the normal direction as shown in FIG. 1A, the immersion angle is defined to be 0°, that is, the workpiece is vertically lowered. The approach attitude angle a and immersion angle β are each suitably set depending on various factors such as a size of the transfer pattern P, a size of the steering wheel 1A, a thickness of the rod-like element, and the like. However, the angles set are not necessarily kept constant during transfer of the transfer pattern to the workpiece. For example, when the apparent plane R of the workpiece W somewhat has a curvature, the angle may be suitably varied after start of the immersion. For example, in the immersion shown in FIG. 2, the approach attitude angle α and immersion angle β are set to be 10° and 20°, respectively.

Now, liquid pressure transfer printing on the workpiece such as a steering wheel or the like will be described in relation to operation of the liquid pressure transfer printing apparatus 10 thus constructed.

(1) Feeding of the Transfer Film:

First, the transfer film F is fed onto the transfer liquid L in the transfer bath 11 while an activator is coated on a surface of the transfer film F to which a transfer ink is applied. The activator may be made by, for example, mixing a resin material, a pigment, a solvent, a plasticizer and the like with each other at suitable ratios. Alternatively, a solvent such as a thinner or the like may be merely used as the activator. Thus, the term "activators " referred to herein include a thinner and the like. The transfer film F thus coated thereon with the activator absorbs water, to thereby be softened and swollen, resulting in it somewhat extending in all directions. Coating of the activator on the transfer film F is necessary because the transfer film F is normally stored while the applied transfer ink is kept dry. Thus, the coating permits the ink coated surface of the transfer film F to be provided with stickiness, so that the ink on the transfer film F may be transferred. Also, coating of the activator on the transfer film F may be carried out after feeding of the transfer film F onto the transfer liquid L as well. Thus, the terms "the activator is coated on the transfer film to provide the ink coated surface of the transfer film with stickiness and permit the transfer film to be floated on the transfer liquid" referred to herein or an expression similar thereto does not limit the steps to any specific order. Thus, in the present invention, coating of the activator may be carried out either after floating of the transfer film F on the transfer liquid or prior thereto.

(2) Feeding of Steering Wheel:

The workpiece W or steering wheel 1A is set so that a front surface thereof (defined by the time when it is mounted in a vehicle) is kept facing the transfer film F. This permits the joint line Pa of the transfer film F to be positioned on a side of a rear surface of the steering wheel which is substantially out of sight of a driver. Then, the steering wheel 1A is immersed in the transfer liquid L while being suitably maintained at an approach attitude angle α and an inversion angle β by the workpiece holding unit 13. The approach attitude angle α and immersion angle β are not necessarily kept constant during the transfer. The angles α and β may be suitably varied depending on the apparent plane R formed or the like after the start of the immersion as well. Also, the transfer film F, as described above, may be provided thereon with the reference position marks M for relative registration between the transfer pattern P and the workpiece W. Such arrangement of the reference position marks M permits a position at which immersion of the steering wheel 1A is started to be readily determined.

Figures 5A, 5B:
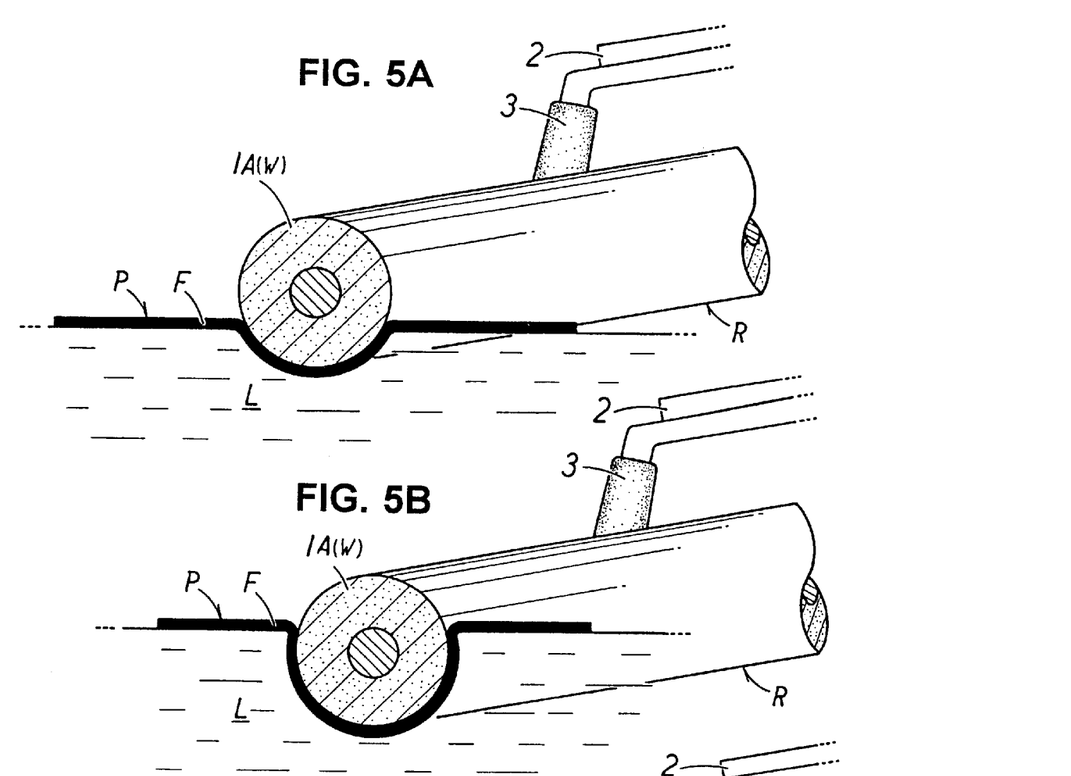
FIGS. 5A to 5C are schematic views showing steps of liquid pressure transfer by stages, respectively.
Figure 5C:
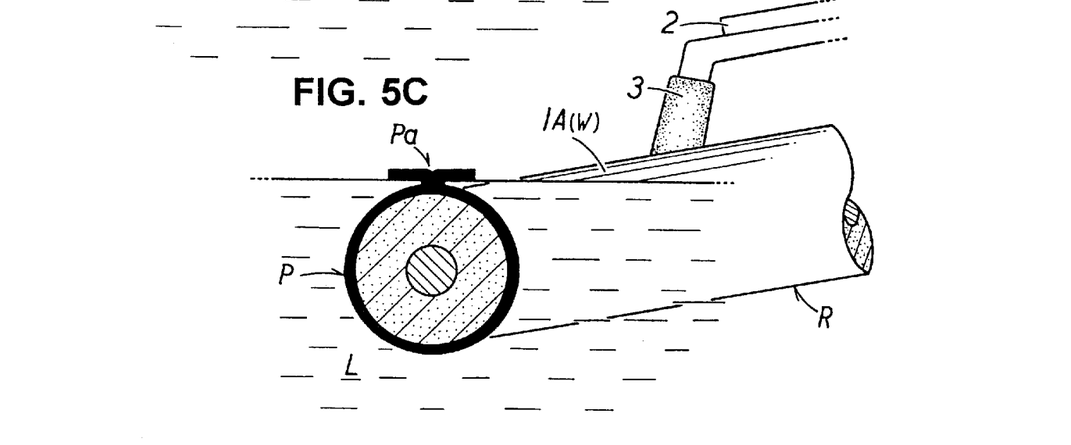

(3) Transfer:

When the steering wheel 1A is immersed in the transfer liquid L, the transfer film F is continuously bonded to the steering wheel 1A, so that the transfer pattern P may be transferred to the steering wheel 1A while keeping distortion of the pattern P inconspicuous. The transfer may be carried out as shown in FIGS. 5A to 5C by way of example. More particularly, the transfer film F circumferentially surrounds the rod-like element continuously from a bottom of the rod-like element to a top thereof on the basis of a diametric section of the rod-like element with progress of immersion of the steering wheel 1A in the transfer liquid L, so that the transfer film F ultimately forms the joint line Pa when it reaches the rear surface side of the steering wheel 1A. Then, the joint line Pa is formed on a whole circumference of the rear surface of the steering wheel 1A, resulting in the transfer being substantially completed.

Now, distortion of the transfer pattern P on the steering wheel 1A will be described. First, it is supposed that on a circumference of the diametric section of the rod-like element of the steering wheel 1A, a lowermost point at which the transfer is first initiated, an uppermost point at which the joint line Pa of the transfer pattern P is formed, an innermost peripheral point positioned between the lowermost point and the uppermost point, and an outermost peripheral point positioned therebetween are designated by reference characters P0, P1, P2 and P3 in FIG. 1B, respectively. In this instance, in a region in which the transfer is carried out from the lowermost point P0 through the innermost peripheral point P2 to the uppermost point P1, a radius of the rod-like element projected on a horizontal plane is gradually decreased from the lowermost point P0 to the innermost peripheral point P2 and gradually increased from the innermost peripheral point P2 to the uppermost point P1. Consequently, in a region where the transfer is carried out from the lowermost point P0 through the outermost peripheral point P3 to the uppermost point P1, the radius of the rod-like element projected on a horizontal plane is gradually increased from the lowermost point P0 to the outermost peripheral point P3 and gradually decreased from the outermost peripheral point P3 to the uppermost point P1.

In order to eliminate distortion of the transfer pattern over the whole circumference or periphery of the diametric section of the rod-like element of the steering wheel 1A, the transfer pattern P would be preferably formed so as to permit such a radius of the rod-like element projected on a horizontal plane to be substantially exactly reproduced. However, this is highly difficult. Therefore, the actual transfer pattern P to be printed is formed to have a substantially annular shape so that the radius projected on a horizontal plane is increased in one direction toward an outside of the transfer pattern. This of course causes the transfer pattern to be subject to distortion, so that a degree of pattern distortion on the circumference or periphery of the diametric section of the rod-like element is of course varied depending on a position on the circumference of the section. However, the transfer film F is softened and swollen due to immersion thereof in the transfer liquid L, resulting in substantially extending in all directions, so that the lowermost point P0, uppermost point P1, innermost peripheral point P2 and outermost peripheral point P3 are substantially identical in pattern distortion in a peripheral or circumferential direction of the whole rod-like element with each other. This permits the pattern distortion on the whole steering wheel 1A to be inconspicuous.

(4) Removal of film and drying:

The steering wheel 1A which has been thus subjected to the liquid pressure transfer printing has a residue of the transfer film F which has not been dissolved in the transfer liquid L adhered thereto. Thus, in order to fully remove the residue, the steering wheel 1A is subjected to washing by showering or the like, followed by drying.

(5) Topcoat

The steering wheel 1A having the transfer pattern thus printed thereon provides the decorated product of the present invention. However, when it is desired that a portion of the steering wheel which has been subjected to the transfer printing exhibit increased gloss and depth of a color, a transparent topcoat is formed thereon by spraying or the like. The topcoat thus formed may be subjected to polishing by buffing or the like.

In the illustrated embodiment, the transfer films F formed in individual sheets are fed one by one by hand to the transfer bath 11 in which the transfer liquid L is kept stationary so that they may be floated on the transfer liquid L. Alternatively, the present invention may be constructed in such a manner that a transfer film F is continuously fed to the transfer bath 11 in which the transfer liquid L is kept flowing. In this instance, the steering wheel 1A may be vertically lowered to the transfer bath 11. Alternatively, the steering wheel may be obliquely lowered to the transfer bath by means of a conveyor of an inverted triangular configuration, an articulated robot or the like. Also, coating of the active agent on the transfer film F may be carried out either before feeding of the transfer film F to the transfer bath 11 or thereafter.

Figure 6:
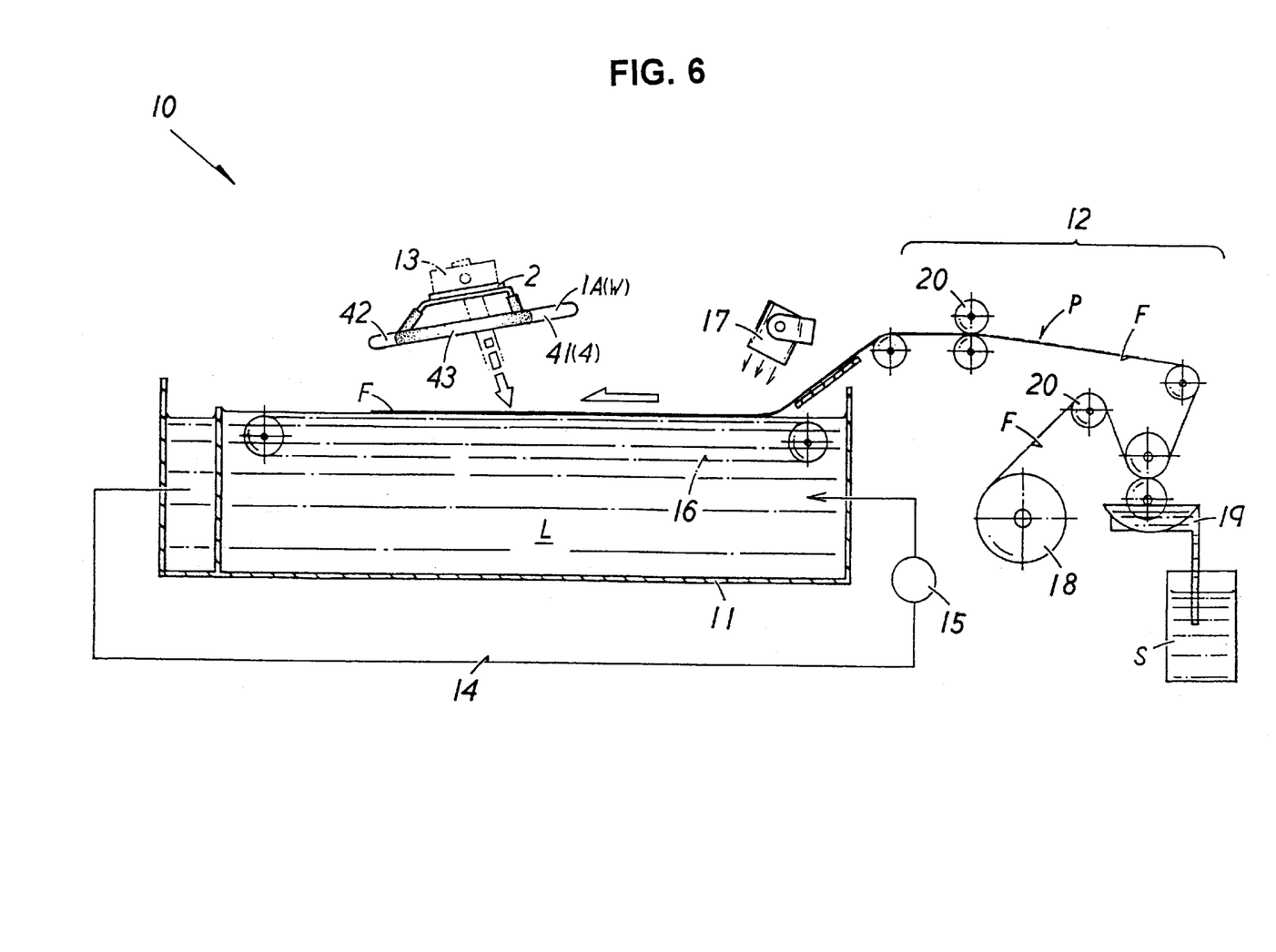
FIG. 6 is a schematic side elevation view showing a unit for continuously feeding a transfer film to a transfer bath, in which a transfer liquid flows.

Referring now to FIG. 6, another embodiment of the present invention is illustrated. The embodiment shown in FIG. 6 is constructed so as to continuously feed a transfer film F to a transfer bath 11. For this purpose, the transfer bath 11 is provided thereon with a circulation pipe line 14 and a pump 15, so that a transfer liquid L may be slowly circulated as indicated by an arrow in FIG. 6. Also, the transfer bath 11 is provided on each of opposite side ends thereof with a guide chain 16. Further, the transfer bath 11 is provided with a fan unit 17, which is positioned on an upstream side of the transfer liquid L. Thus, the transfer liquid L circulated, the guide chains 16, the fan unit 17 and the like cooperate with each other to permit the transfer film F floatedly supported on a surface of the transfer liquid L to be carried toward a workpiece W or a steering wheel 1A while preventing waves from forming in the transfer liquid L.

Also, in the illustrated embodiment, a transfer film feed unit 12 is substituted for the transfer film storage unit incorporated in the embodiment described above. The transfer film feed unit 12 includes a film roll 18 constituted by winding a water-soluble transfer film F in a roll-like manner, a solvent tank 19 having an activator S stored therein, and feed rollers 20. The transfer film F delivered from the film roll 18 is activated by the activator S in the solvent tank 19 and then continuously fed to the transfer bath 11.

After the transfer film F fed to the transfer bath 11 which is thus activated is carried to a suitable position, the steering wheel 1A is immersed in the transfer bath 11 by means of a workpiece holding unit 13. Operation of transferring a transfer pattern P from the transfer film F to the workpiece W in the illustrated embodiment is carried out in substantially the same manner as that in the embodiment described above.

As can be seen from the foregoing, the present invention permits the workpiece such as a steering wheel or the like including the rod-like element curved to form the apparent plane to be readily and positively decorated with the transfer pattern specifically intended for the workpiece.

Also, the present invention permits the approach attitude angle and/or immersion angle to be optimally set depending on a type of the transfer pattern, as well as a size of the workpiece, a configuration thereof and the like.

Further, positioning or registration between the transfer pattern of the transfer film floatedly supported on the transfer liquid and the workpiece is relatively readily attained, to thereby prevent misregistration of the transfer film.

Moreover, distortion of the pattern is varied depending on a position on the periphery of the diametric section of the rod-like element of the workpiece. However, the pattern distortion is substantially the same irrespective of a position on the circumference of the whole rod-like element. Thus, the transfer printing may be carried out while rendering the pattern distortion inconspicuous.

While preferred embodiments of the invention have been described with reference to the drawings, obvious modifications and variations are possible in light of the above teachings. It is therefore to be understood that within the scope of the appended claims, the invention may be practiced other than as specifically described.

What is claimed is:

1. A liquid pressure transfer method comprising:
   supporting a transfer film on a surface of a transfer liquid while floating the transfer film on the surface, the transfer film having a transfer pattern for decoration printed only on an area of the transfer film having a shape corresponding to a surface shape of a workpiece to be covered by the transfer pattern so that the transfer pattern has a pattern configuration;
   handling the workpiece so that the workpiece approaches the transfer film from a position above the transfer pattern; and
   immersing the workpiece in the transfer liquid so as to transfer the transfer pattern onto a surface of the workpiece so as to decorate the workpiece, the workpiece including a rod-shaped element curved to form a loop in a geometric plane, the transfer pattern being printed on the transfer film such that the pattern configuration of the transfer pattern corresponds to a configuration of the workpiece;
   wherein said transferring of the transfer pattern to the surface of the workpiece comprises bonding the transfer film to the rod-shaped element of the workpiece so that the transfer film circumferentially surrounds the rod-shaped element continuously from a bottom of the rod-shaped element to a top of the rod-shaped element with respect to a diametric cross-section of the rod-shaped element.

2. The liquid pressure transfer method of claim 1, wherein said handling of the workpiece comprises orienting the workpiece during the approach of the workpiece to the transfer film so that approach attitude angle defined between the apparent plane of the workpiece and the surface of the transfer liquid is within a range of ±15°.

3. The liquid pressure transfer method of claim 2, wherein the transfer film has reference position marks thereon, further comprising aligning the transfer pattern and the workpiece using the reference position marks during said immersing of the workpiece.

4. The liquid pressure transfer method of claim 2, wherein said immersing of the workpiece comprises immersing the workpiece in the transfer liquid in a substantially vertical direction.

5. The liquid pressure transfer method of claim 4, wherein the transfer film has reference position marks thereon, further comprising aligning the transfer pattern and the workpiece using the reference position marks during said immersing of the workpiece.

6. The liquid pressure transfer method of claim 1, wherein said immersing of the workpiece comprises immersing the workpiece in the transfer liquid in a substantially vertical direction.

7. The liquid pressure transfer method of claim 6, wherein the transfer film has reference position marks thereon, further comprising aligning the transfer pattern and the workpiece using the reference position marks during said immersing of the workpiece.

8. The liquid pressure transfer method of claim 1, wherein the transfer film has reference position marks thereon, further comprising aligning the transfer pattern and the workpiece using the reference position marks during said immersing of the workpiece.

9. The liquid pressure transfer method of claim 1, wherein the transfer pattern has a substantially annular pattern configuration corresponding to the steering wheel.

10. The liquid pressure transfer method of claim 1, further comprising:
    gathering a first group of pattern data for a planar rectangular-shaped pattern and converting the first group of pattern data into a second group of pattern data for a round-shaped pattern; and
    forming the transfer pattern on the transfer film using the second group of pattern data so that the transfer pattern has a substantially annular pattern configuration.

11. The liquid pressure transfer method of claim 1, wherein said transferring of the transfer pattern onto the surface of the workpiece comprises bonding the transfer film to the workpiece so that the transfer pattern entirely surrounds the rod-shaped element of the workpiece.

12. A liquid pressure transfer method comprising:
    forming a transfer film having a transfer pattern for decoration printed only on an area of the transfer film having a shape corresponding to a surface shape of a workpiece to be covered by the transfer film the transfer pattern so that the transfer pattern has a pattern configuration, the transfer pattern being printed on the transfer film such that the pattern configuration of the transfer pattern corresponds to a configuration of the workpiece including a rod-shaped element curved to form a loop in a geometric plane;
    supporting the transfer film on a surface of a transfer liquid while floating the transfer film on the surface;
    handling the workpiece so that the workpiece approaches the transfer film from a position above the transfer pattern; and
    immersing the workpiece in the transfer liquid so as to transfer the transfer pattern onto a surface of the workpiece so as to decorate the workpiece;
    wherein said transferring of the transfer pattern onto the surface of the workpiece comprises bonding the transfer film to the rod-shaped element of the workpiece so that the transfer film circumferentially surrounds the rod-shaped element continuously from a bottom of the rod-shaped element to a top of the rod-shaped element with respect to a diametric cross-section of the rod-shaped element.

13. The liquid pressure transfer method of claim 12, wherein the workpiece comprises a steering wheel, said forming of the transfer film having the transfer pattern printed thereon comprises printing the transfer pattern on the transfer film so that the transfer pattern has a substantially annular pattern configuration corresponding to a geometric plane of the steering wheel.

14. The liquid pressure transfer method of claim 13, further comprising:
   gathering a first group of pattern data for a planar rectangular-shaped pattern and converting the first group of pattern data into a second group of pattern data for a round-shaped pattern; and
   said printing of the transfer pattern on the transfer film comprises printing the transfer pattern on the transfer film using the second group of pattern data so as to form the transfer pattern having the substantially annular pattern configuration.

15. The liquid pressure transfer method of claim 13, wherein said handling of the workpiece comprises orienting the workpiece during the approach of the workpiece to the transfer film so that an approach attitude angle defined between the apparent plane of the workpiece and the surface of the transfer liquid is within a range of ±15°.

16. The liquid pressure transfer method of claim 13, wherein said immersing of the workpiece comprises immersing the workpiece in the transfer liquid in a substantially vertical direction.

17. The liquid pressure transfer method of claim 13, wherein said forming of the transfer film includes forming reference position marks on the transfer film, further comprising aligning the transfer pattern and the workpiece using the reference position marks during said immersing of the workpiece.

18. The liquid pressure transfer method of claim 12, wherein said handling of the workpiece comprises orienting the workpiece during the approach of the workpiece to the transfer film so that an approach attitude angle defined between the apparent plane of the workpiece and the surface of the transfer liquid is within a range of ±15°.

19. The liquid pressure transfer method of claim 12, wherein said forming of the transfer film includes forming reference position marks on the transfer film, further comprising aligning the transfer pattern and the workpiece using the reference position marks during said immersing of the workpiece.

20. The liquid pressure transfer method of claim 12, wherein said immersing of the workpiece comprises immersing the workpiece in the transfer liquid in a substantially vertical direction.

21. The liquid pressure transfer method of claim 12, further comprising:
   gathering a first group of pattern data for a planar rectangular-shaped pattern and converting the first group of pattern data into a second group of pattern data for a round-shaped pattern; and
   said printing of the transfer pattern on the transfer film comprises printing the transfer pattern on the transfer film using the second group of pattern data so that the transfer pattern has a substantially annular pattern configuration.

22. The liquid pressure transfer method of claim 12, wherein said transferring of the transfer pattern onto the surface of the workpiece comprises bonding the transfer film to the workpiece so that the transfer pattern entirely surrounds the rod-shaped element of the workpiece.

* * * * *